United States Patent [19]

Morrison

[11] Patent Number: 4,666,266

[45] Date of Patent: May 19, 1987

[54] EYEGLASSES HAVING LENS STORAGE MEANS

[76] Inventor: Robert J. Morrison, P.O. Box 1771, Harrisburg, Pa. 17105

[21] Appl. No.: 677,093

[22] Filed: Nov. 30, 1984

[51] Int. Cl.⁴ .......................... G02C 5/14; G02C 7/08
[52] U.S. Cl. ...................................... 351/57; 351/58; 351/111
[58] Field of Search ............................ 351/57, 58, 111

[56] References Cited

U.S. PATENT DOCUMENTS 2,737,847 3/1956 Tesauro ........................... 351/111 U
4,247,178 1/1981 Cook ..................................... 351/58

FOREIGN PATENT DOCUMENTS 151622 5/1953 Australia ............................... 351/57
806852 2/1969 Canada ................................... 351/85
686924 2/1953 United Kingdom ................. 351/57

Primary Examiner—Rodney B. Bovernick
Attorney, Agent, or Firm—Robert A. Green

[57] ABSTRACT

The disclosure is of eyeglass frames having the temples structured to provide storage for the eyeglass lenses or for auxiliary lenses, and the frame also includes various structural arrangements for placing and holding the lenses in operative relation with the eyes.

4 Claims, 14 Drawing Figures

EYEGLASSES HAVING LENS STORAGE MEANS

BACKGROUND OF THE INVENTION

At the present time, eyeglass wearers have glasses for normal wear and other glasses for wear in the sun. In addition, many people wear bifocal lenses but are uncomfortable with them and would prefer to wear glasses for normal vision at times and full reading glasses at times. At the present time, no simple arrangement is known to satisfy these needs; however, this problem is solved by the present invention which provides means for storing one or more lenses on the temples of the eyeglass frame.

DESCRIPTION OF THE INVENTION

Figure 1:
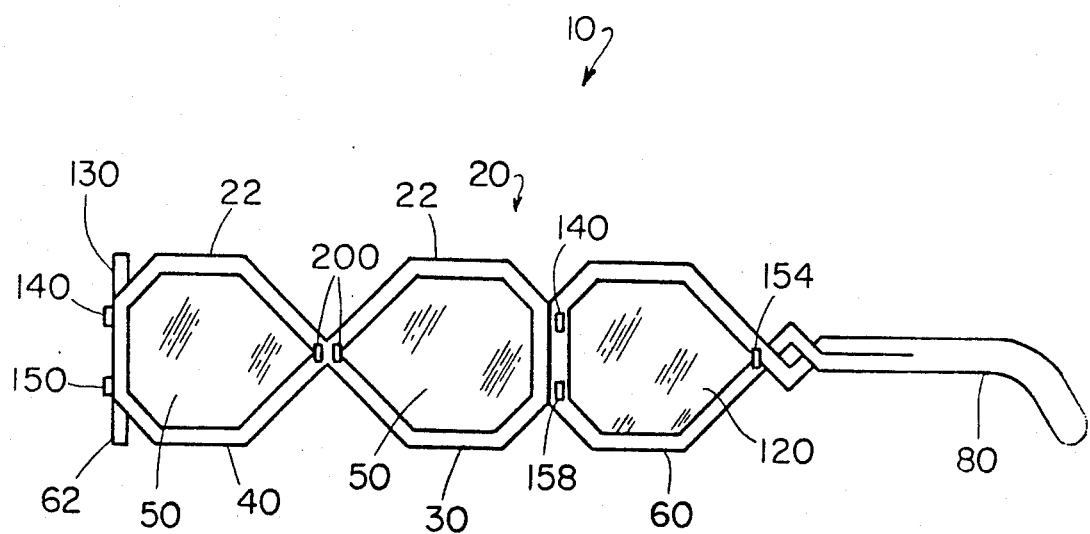
FIG. 1 is a front view of a pair of eyeglasses embodying the invention.
Figure 2:
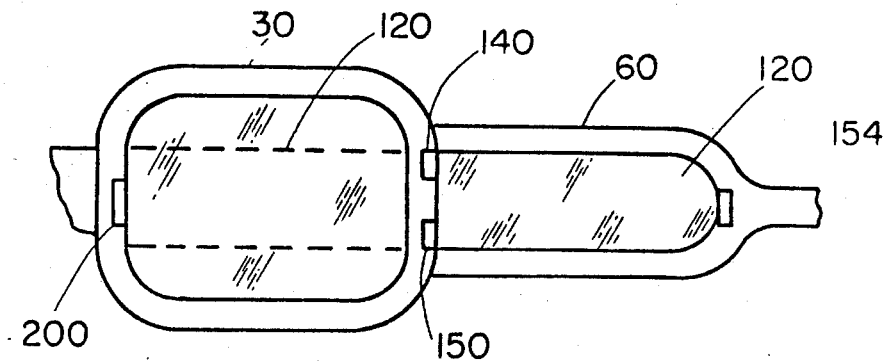
FIG. 2 is a front view of a modification of the eyeglasses of FIG. 1.

One embodiment of the invention for storing lenses on the temples is shown in FIGS. 1 and 2 and comprises a pair of eyeglasses or spectacles 10 including the usual frame 20 having left and right eye portions 30 and 40, respectively, in which lenses 50 are secured, as is well known. The frame 20 also includes left and right temples 60 and 62, with left temple 60 being shown extended. Each temple includes a rear portion 80 which engages the ear and extends toward the frame, and, toward the front, each temple includes a large area, open portion which is of any suitable shape. The temples are hinged to the lens-receiving portions 30 and 40 of the frame, as is well known.

According to the invention, auxiliary lenses 120 and 130 of suitable size, shape, and area for the intended purpose are secured by hinges 140 and 150 at one edge to the sides of the eye portions 30 and 40 of the frame, generally in the vicinity of the hinges for the temples. Thus, the auxiliary lenses 120 and 130 can be pivoted on their hinges 140 and 150, either to cover the set-in lenses 50, or so that they are out of the way of the set-in lenses and overlie the large-area portions 60 and 62 of the temples. The hinges may be arrayed so that the auxiliary lenses overlie the inside or the outside of the eye portions 30 and 40. A retaining clip 154 is provided on each temple to engage the end of the lens 120 or 130 remote from the hinges when the lenses are stored on the temples. The clips 154 may be of metal or plastic and sufficiently flexible to permit securing and releasing the auxiliary lenses.

According to the invention, the auxiliary lenses 120 and 130 may be tinted to act as sunglasses when in place over the set in lenses, or they may be lenses which convert the set-in lenses to reading glasses when they are in place overlying the set-in lenses. They also may operate as the only lenses provided, in which case, lenses 50 are not present. The lenses 120 and 130 may also be fog lenses or safety lenses, or any other type of lens, as desired.

Figure 3:
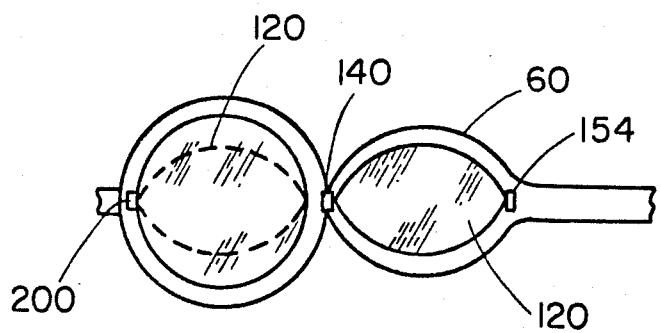
FIG. 3 is a side view of another modification of the eyeglasses of FIG. 1.
Figure 4:
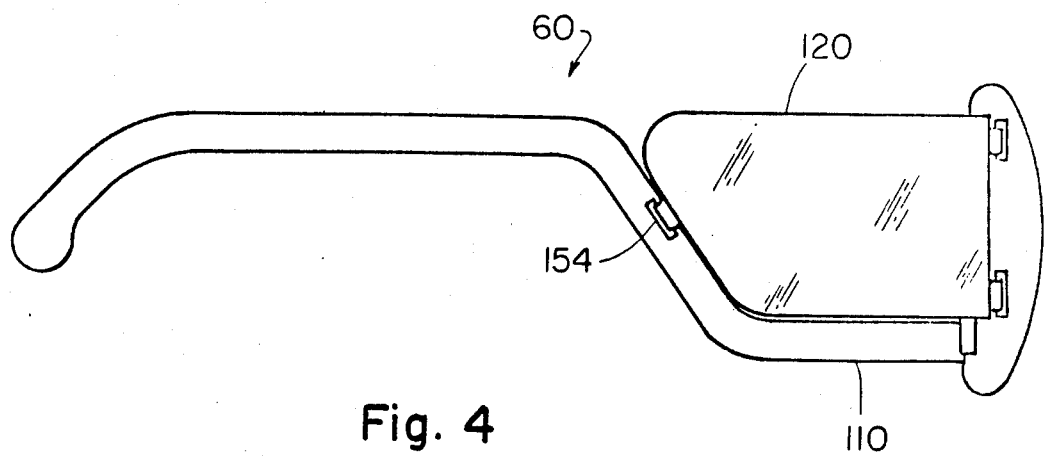
FIG. 4 is a side view of a portion of a pair of eyeglasses showing a modification of the invention.

Examples of other possible shapes of storage temples and auxiliary lenses are illustrated in FIGS. 2, 3, and 4.

Figure 5:
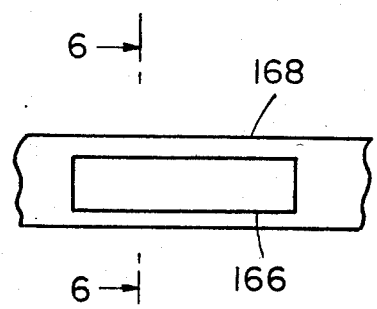
FIG. 5 is a side view of a portion of a temple showing a modification of the invention.
Figure 6:
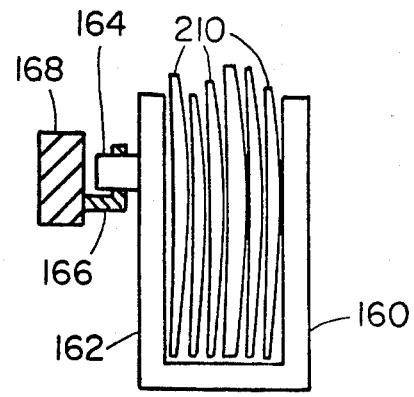
FIG. 6 is a sectional view of the temple of FIG. 5 and a lens holder for use therewith.

A modification of the invention shown in FIGS. 5 and 6 includes a pouch or sheath 160 adapted to carry a plurality of lenses 210 of any of the types mentioned above. One sheath for all of the lenses may be provided, or two may be provided, one for each temple and one carrying the right lenses and one carrying the left lenses. The sheath 160 may be of metal or plastic, and, on the outside rear wall 162, it carries a plate or bar 164, spaced from the rear wall, and is adapted to receive or be coupled to an L-shaped bracket 166 formed on the temple 168 whereby the sheath 160 is held on the temple.

Figure 7:
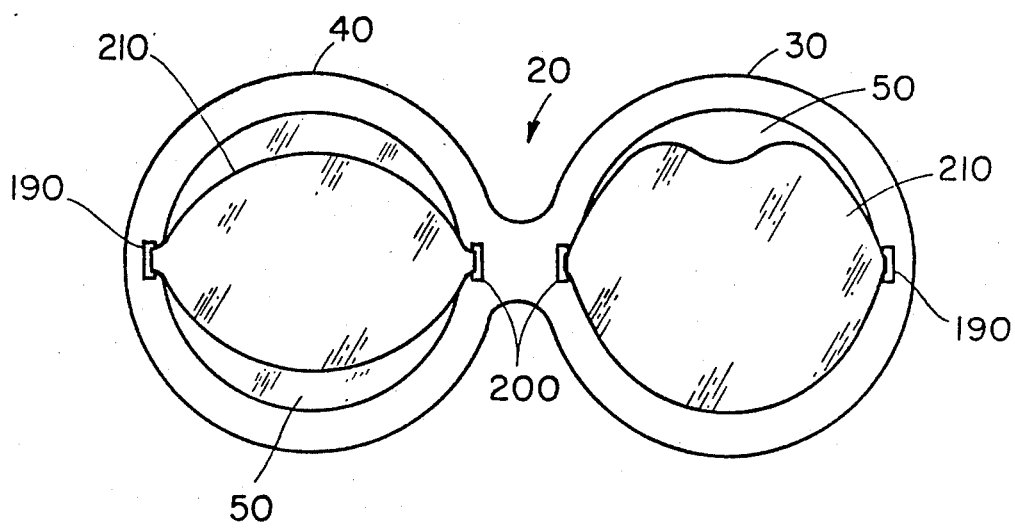
FIG. 7 is a front view of an eyeglass frame showing another modification of the invention.

One arrangement for using the lenses carried in the sheath 160 is shown in FIG. 7, wherein the outer surface of the eye portions 30 and 40 are provided with two pairs of slots, retaining clips, or other similar means 190 and 200, into which left and right edges of auxiliary lenses 210 can be inserted whereby such lenses can be held in place in front of the eyes. As shown, the auxiliary lenses 210 can have different shapes and may be smaller than the lens opening or eye portion of the frame, depending on their function.

If desired, the retaining means 190 and 200 may be provided on the inner surface of the frame adjacent to the eyes.

Figure 8:
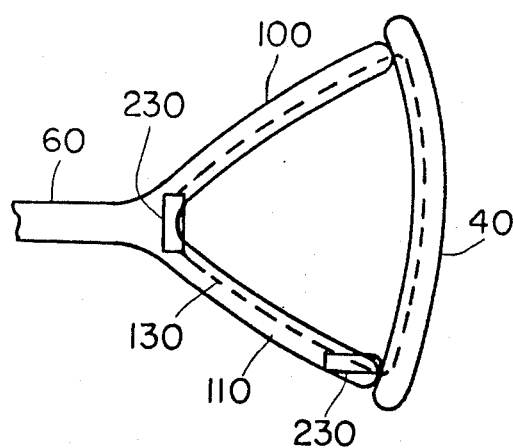
FIG. 8 is a side view of a temple illustrating another form of the invention.
Figure 9:
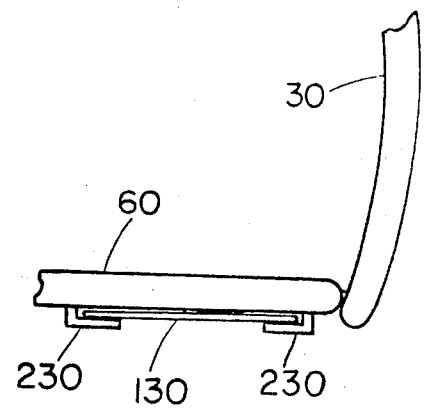
FIG. 9 is a plan view of a portion of the eyeglasses of FIG. 8.

Various other means may be provided for storing separate lenses, such as lenses 210. As shown in FIGS. 8 and 9, the outer surfaces of the temples 60 are provided with a plurality of brackets or clips 230, suitably shaped and positioned, to support one or more individual lenses which are thus carried or stored on both temples. When desired, a pair of lenses are removed from the storage brackets 230 and are set in place in the frame. The lenses can be set into the usual grooves, or they may be held in place by retainers 190 (FIG. 7), either in front of the spectacle lenses or behind them.

Figure 10:
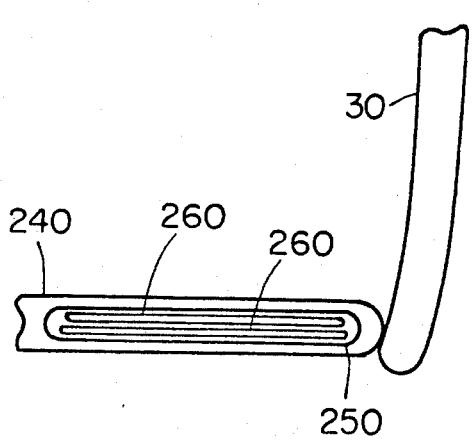
FIG. 10 is a plan view of a portion of an eyeglass frame illustrating another embodiment of the invention.
Figure 11:
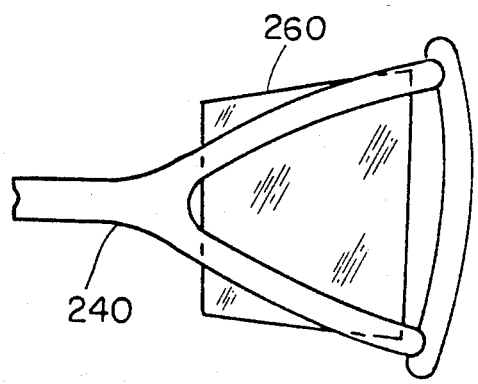
FIG. 11 is a side view of the frame of FIG. 10.

In still another mofidication of the invention shown in FIGS. 10 and 11, the temples 240 are formed with slots 250 in which one or more lenses 260 can be stored until used.

Figure 12:
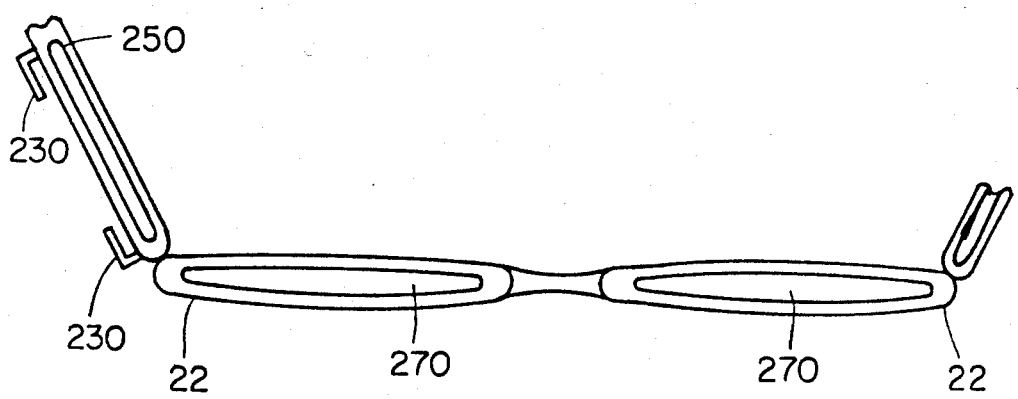
FIG. 12 is a plan view of a portion of an eyeglass frame illustrating another form of the invention.

In another modification of the invention shown in FIG. 12, the eye portions of a frame are provided in the upper horizontal cross pieces 22 with slots 270 into which lenses can be inserted for use.

It is clear that the invention is extremely advantageous to wearers of eyeglasses who can carry several different types of lenses on their frames and can readily change lenses or modify lenses which are carried in the frames.

Figure 13:
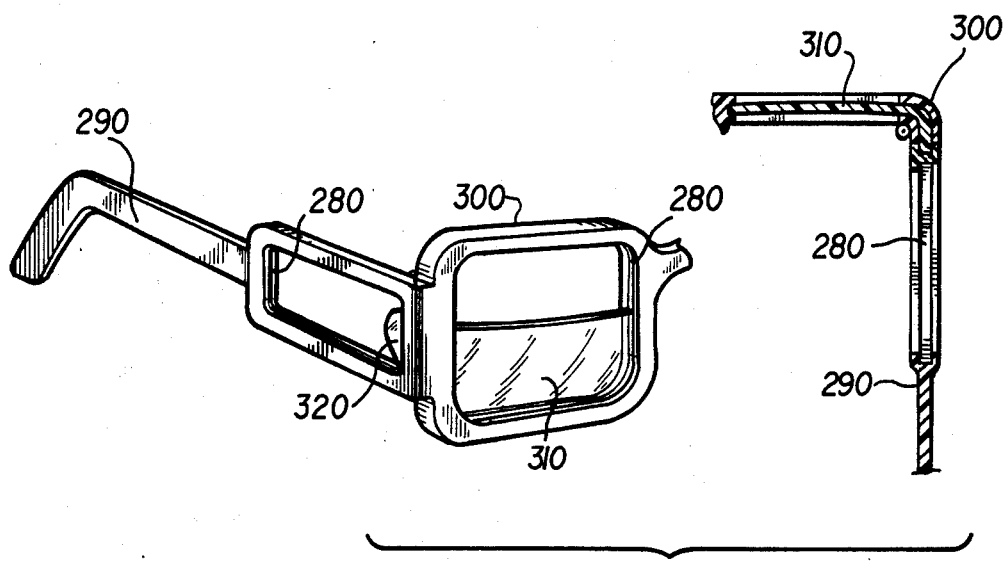
FIG. 13 is a perspective view of another modification of the invention.

In a modification of the invention shown in FIG. 13, a continuous channel 280 is provided extending from the temple 290 into the front lens holder 300 on each side so that a flexible plastic lens 310 can slide from the temple 290 into the lens holder 300 in front of the wearer's eyes. The lens 310 may have a tab 320 on its trailing edge to facilitate the sliding operation. The lens may be retracted from the lens holder 309 back into the temple 290. The temple may be shaped to accommodate a full size lens or a half lens which may be used, e.g. for reading.

Figure 14:
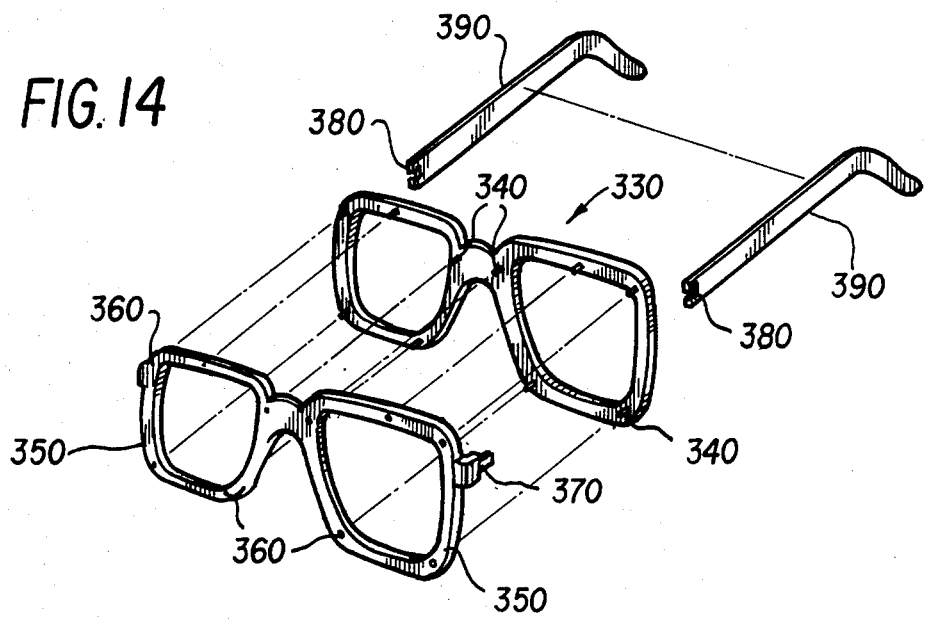
FIG. 14 is a perspective exploded view of still another modification of the invention.

In another modification of the invention illustrated in FIG. 14, a lens holder 320 of an eyeglass frame 330 is provided on its front surface with pins 340 to which a variety of lens holders 350, having corresponding holes or clips 360, may be coupled with the holes or clips 360 engaging the pins 340. The separate lens holder 350 may also include suitably shaped clamps 370 or the like which can be snapped onto mating portions 380 provided on the temples 390 of the frame 330.

What is claimed is:

1. Eyeglasses comprising
a frame having left and right eye portions and left and right temples, said temples having storage means for carrying and storing lenses,
a pair of lenses, and
means for holding said lenses in operative relation with said eye portions of the frame in front of the eyes of the wearer of the eyeglasses,
said eye portions and said temples including aligned channels in which a lens can be moved from an eye portion to the adjacent temple and vice versa.

2. The apparatus of claim 1 and including means hingedly connecting said lenses to said frame.

3. Eyeglasses comprising
a frame including left and right eye portions and left and right temples, the left temple being coupled to said left eye portion and said right temple being coupled to said right eye portion,
each temple including an enlarged portion adjacent to its eye portion for receiving and storing a flexible lens and a flexible lens positioned in each of said enlarged portions,
a slot in each of said left and right eye portions communicating with the enlarged portion of the temple adjacent to it whereby the flexible lens in the adjacent temple can be moved from said enlarged portion through said slot and into said eye portion in operative relation with the associated eye of the wearer of the eyeglasses.

4. The eyeglasses defined in claim 3 wherein said flexible lens is positioned to occupy the lower portion of its eye portion to operate in the nature of a bifocal lens or the like.

* * * * *